Feb. 4, 1958 F. L. WASHBURN, JR 2,822,467

ELECTRONIC SIGNAL STORAGE AND READING SYSTEMS

Filed June 25, 1952 2 Sheets-Sheet 1

FREDERICK L. WASHBURN, JR
INVENTOR.

BY John J. Rogan
ATTORNEY

ELECTRONIC SIGNAL STORAGE AND READING SYSTEMS

Filed June 25, 1952 2 Sheets-Sheet 2

INVENTOR.
FREDERICK L. WASHBURN, JR.

BY

John J. Rogan
ATTORNEY

United States Patent Office 2,822,467
Patented Feb. 4, 1958

2,822,467

ELECTRONIC SIGNAL STORAGE AND READING SYSTEMS

Frederick Leander Washburn, Jr., Schenectady, N. Y., assignor to National Union Electric Corporation, a corporation of Delaware Application June 25, 1952, Serial No. 295,522
16 Claims. (Cl. 250—27)

This invention relates to signal storage and reading systems and more especially it relates to such systems employing an electron beam for effecting the storing and reading functions.

A principal object of the invention is to provide a novel signal storage and reading system wherein the differential voltage-current characteristics of a gas discharge device are used to control selectively the storing and reading functions.

Another object is to provide a signal storage and reading system wherein a series of gas discharge tubes are used in conjunction with a series of secondary electron emission targets to control the storage and reading functions of a cathode-ray beam.

A feature of the invention relates to a signal recording-arrangement wherein a cathode-ray scanning beam is keyed off and keyed on by signals to be recorded, and the same beam is used in conjunction with a series of biased gas diodes to determine which one of two discrete potentials a recording target is to assume.

Another feature relates to the combination of a cathode-ray tube having means to develop a cathode-ray beam and for causing it to scan a series of secondary emission or dynode targets. Each of these targets is connected in circuit with a corresponding gaseous conduction diode and each diode is, during the recording condition, biased to a predetermined voltage just below that required to render it conductive. When the cathode-ray beam is keyed on, at any particular instant, by a signal pulse, it immediately raises the said bias to cause the corresponding diode to become conductive, and thus drops the potential of the corresponding target. The diode because of its inherent characteristics remains conductive and therefore the associated target stays at its lower or recording potential.

A further feature relates to the combination of a series of gaseous diodes which are rendered selectively conductive under control of the potentials of a corresponding series of dynode targets. These targets have their potentials controlled by the keying on of a cathode-ray beam and under control of a corresponding dynode-anode which anode can be maintained at one of two discrete potentials corresponding respectively to storing or "writing" and "reading."

A further feature relates to the novel combination of circuits and apparatus for enabling a series of gaseous conduction diodes to be used as signal storage control elements to store signal voltages of two discrete voltage levels. The circuits are so arranged that the storage action is under control of a cathode-ray beam and a series of secondary emission or dynode targets, whereby the storage action is practically instantaneous.

A still further feature relates to the novel organization, arrangement and relative location and interconnection of parts which cooperate to provide an improved signal storage and reading system.

Other features and advantages not particularly enumerated, will be apparent after a consideration of the following detailed description and the appended claims.

Fundamentally, the invention is based upon the peculiar characteristics of a gaseous conduction tube, and the peculiar action of a dynode; and upon the combination of these two characteristics in a novel and inventive manner. Gas diodes consisting for example, of a pair of spaced electrodes in a gaseous atmosphere within an enclosing bulb, have the property of requiring a small voltage change for large current variation through the diode, and because of that fact they act like constant voltage devices in suitable circuits. They also have the property of remaining non-conductive until a predetermined voltage is applied across the diode electrodes, and the voltage required to make the diode conductive is higher than that required to keep it conductive once it has been triggered to conductivity. In accordance with one feature of the present invention, novel means are provided for applying two discrete voltage levels to the diode. First a level which is higher than that required to maintain conduction, but not high enough to start conduction. Second, the maintenance of a voltage level to keep the diode conductive once it has been keyed to conductivity. The "writing" or recording of signals or other information which has been translated into signal voltages is accomplished by momentarily raising the voltage across a selected normally non-conductive diode to a level at which it becomes conductive. This momentary raising of the diode to its "starting" potential is controlled by a secondary emission target or dynode and a cathode-ray beam. The electron return circuit for the dynode is completed through a high impedance path whose voltage drop in response to the beam current, develops an instantaneous high voltage when the target is struck by the beam, and this voltage drop is sufficient to key the diode to conductivity. However, the diode current through the diode causes the voltage drop in the said return circuit to lower the potential of the corresponding dynode, but the associated diode remains conductive. In other words, when a dynode target is being acted on by the cathode-ray beam for recording, it first causes the associated diode to be keyed on to conductivity, and then the said diode drops the voltage of the target to a predetermined level which it continues to assume. The remaining dynode targets which have not been acted on by the cathode-ray beam for recording, remain at their higher potential level. This difference in voltage level of a dynode target which has been recorded on, and a target which has not been recorded on, is subsequently used to enable a corresponding "reading" current to be obtained.

Figure 1:
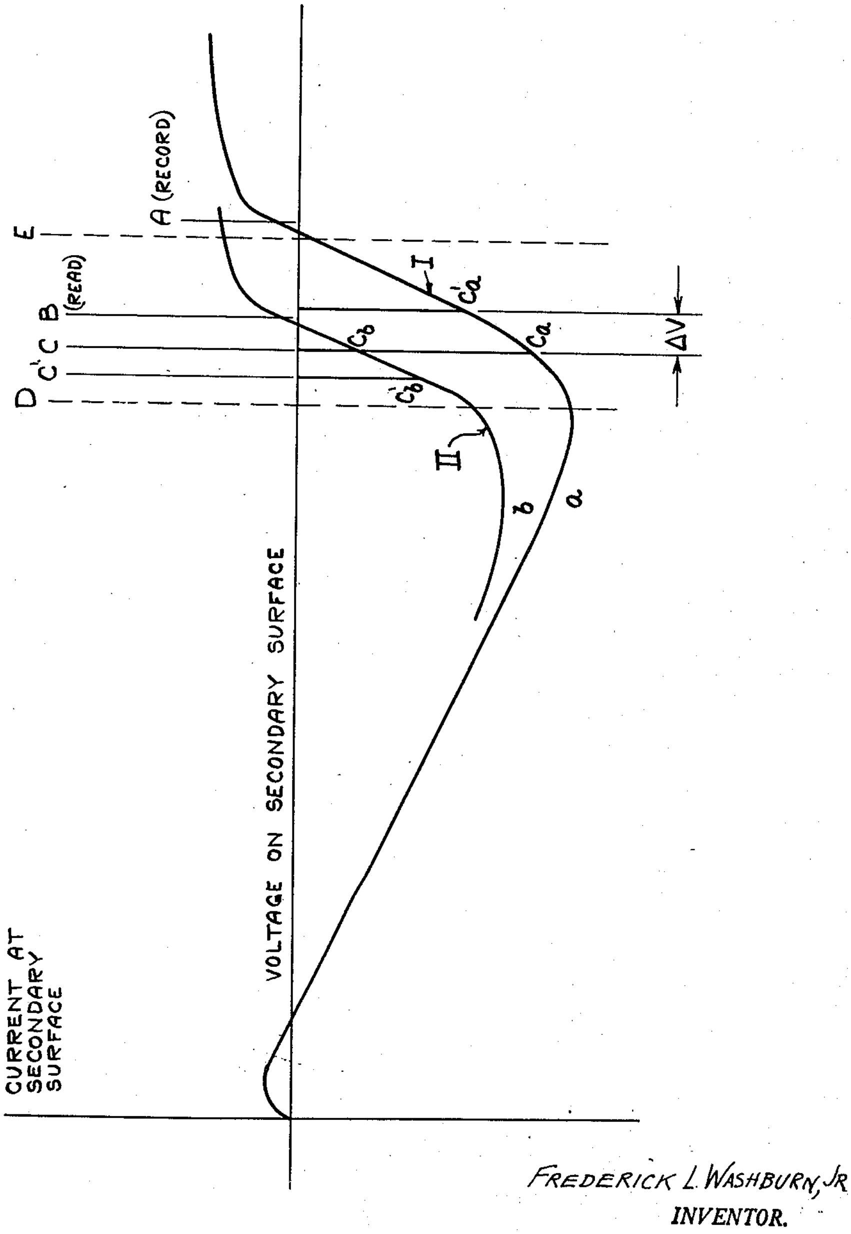
Fig. 1 shows a set of graphs used in explaining the invention.

In order fully to understand the recording and reading functions, reference should be had to Fig. 1 of the drawing. Fig. 1 shows curves of electron emission from a typical secondary electron emission surface or dynode. A dynode, as is well-known, requires a source of primary electron emission, for example a cathode-ray beam, a secondary emission target, and an electrode or an anode adjacent the target. The collector is biased to a higher positive potential than the target so that when the target is struck by the primary electrons in the beam, the secondaries emitted by the target are practically all collected by the collector electrode and are prevented from returning to the target. The result is that if the target is insulated from ground, or is returned to ground externally through a very high impedance circuit, it assumes a positive "floating" potential. This floating potential is of course dependent upon the positive bias which is applied to the associated collector electrode. In Fig. 1, the curve I shows the relation between the actual voltage on a dynode target with respect to the current to or from that target, when the voltage of the associated electrode is at a relatively high value A. The curve II represents the relation between voltage on the same target and current flow to or from that target, when the said collector is at a lower bias voltage, for example B. For example, if the voltage applied to the target varies between C and C′, and if the associated collector is at a voltage B, the target current will vary from $C_b$ to $C'_b$. In other words, at the lower target voltage C′, the target current will be greater in magnitude (namely $C'_b$) than when the target is at the higher voltage C. This same negative relation exists when the collector is at the higher voltage A. The target current $C_a$ is greater for the lower target voltage C, than it is for a higher target voltage. In accordance with the invention, the collector electrode is biased positively to the level A for recording the signals; and is biased to the lower level B for reading the signals. Therefore, during the recording condition, the target current can be made to vary between $C_a$ and $C'_a$; while during reading the target current can be made to vary between $C'_b$ and $C_b$. Thus, the magnitudes of the reading currents are very much less than the magnitudes of the recording currents. Preferably, although not necessarily, the parameters of the system are chosen so that the dynode targets operate in the region between D and E where the corresponding current-voltage relation both for recording and reading, may be substantially linear.

Figure 2:
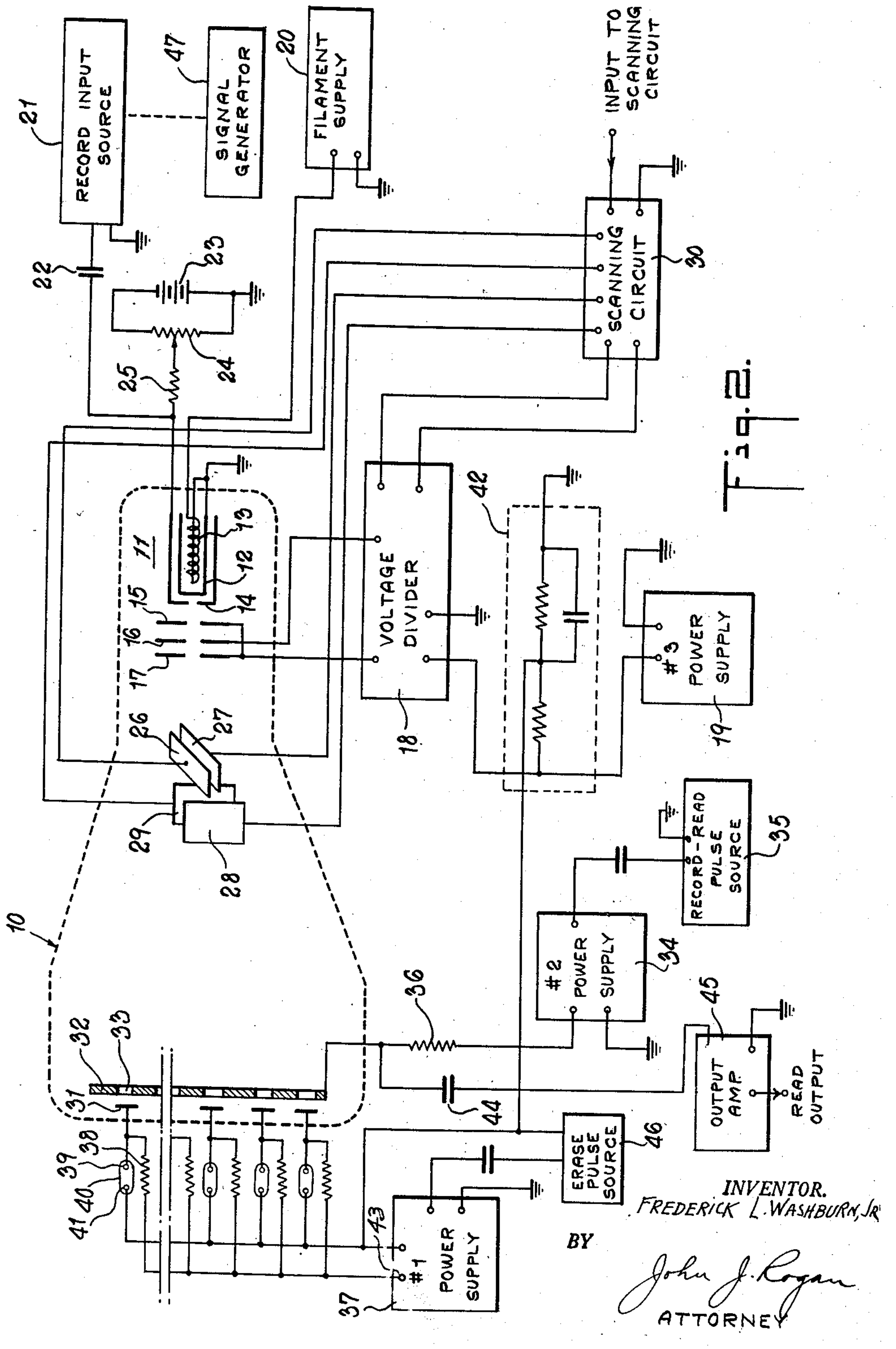
Fig. 2 is a schematic wiring and block diagram of a signal storage and reading system according to the invention.

Referring to Fig. 2, the numeral 10 represents the evacuated enclosing bulb or envelope of any well-known form of cathode-ray tube. Suitably mounted within the bulb is the usual electron gun 11 for developing an electron beam, this gun including for example the electron-emitting cathode 12, the apertured control electrode 14, and the electron accelerating and focussing electrodes 15, 16, 17. The electrodes 15, 16, 17 are biased to respective positive potentials as well-known in the cathode-ray tube art, from a suitable voltage divider 18, which is supplied with the requisite voltage from the regulated power supply source 19. Likewise, the filament or heater 13 is heated to the required temperature by being connected to a suitable filament current supply source 20. The signals which are to be recorded may be derived from any suitable signal voltage source 21, which is coupled for example, through a capacitor 22, to the control electrode 14. Electrode 14 may be negatively biased by a suitable battery 23 and potentiometer 24, through decoupling resistor 25, so that when no signals are to be recorded, the beam is at cut-off. The focussed cathode-ray beam when keyed on by a signal to be recorded, passes through a suitable beam-deflecting system, comprising for example the vertical beam-deflecting plates 26, 27, and the horizontal beam-deflecting plates 28, 29. These plates are supplied with the usual vertical and horizontal saw-tooth scanning waves from any well-known scanning circuit 30.

Mounted adjacent the enlarged end of bulb 10 are a series of secondary electron emitting elements or dynode targets 31. Mounted in relatively close spaced relation to these targets is a collector or anode 32, having a series of apertures or windows 33, one for each dynode and in alignment therewith. While the drawing shows only one vertical row of dynodes and their corresponding windows 33 in the collector 32, it will be understood that a series of such rows may be used depending upon the number of signal recording positions that the cathode-ray beam is to assume. For example, if 100 different pulses are to be recorded, there may be provided 10 rows of targets 31, with 10 targets in each row. The scanning circuit 30 is designed in the well-known manner so that the cathode-ray beam scans one vertical row completely, and is then shifted to scan the next succeeding row until the entire 10 rows are scanned, whereupon a fly-back voltage is produced in the well-known manner to restore the beam back to its initial position, for example in registry with the first target in the first row. The collector anode 32 is connected to a source 34 of a regulated positive direct current bias voltage. The source 34 is connected also to a source 35 of positive pulses. Normally, that is, during recording of a signal, the positive voltage from source 35 is added to the positive voltage from source 34 and is applied to the collector 32 through a suitable resistance 36. This biases the collector 32 to the recording potential A (Fig. 1). Preferably the source 34 is of the type having a voltage regulator circuit, in which case the pulse from source 35 can be applied to the voltage regulator circuit in the proper polarity to produce the desired voltage addition at the output of source 34.

Each of the dynodes 31 is supplied with a positive direct potential from a suitable regulated direct current supply source 37 through its corresponding individual resistor 38. Each dynode is also directly connected to one of the electrodes, for example electrode 39 of a gas diode 40, the other diode electrode 41 being connected directly to the negative terminal of the source 37. The source 37 is set so that when the cathode-ray beam is not striking a dynode and no signal is to be recorded thereon, the voltage across the corresponding diode 40 is below the conduction "starting" voltage, but is above the voltage required to maintain conductivity through the diode. It will be noted that the negative terminal of source 37 is connected to a voltage divider 42 supplied with voltage from the source 19. The sum of the voltage from divider 42 and the voltage of source 37 is such as to maintain the target 31 at the value C (Fig. 1). Resistor 36 is a low resistor relative to resistor 38. During the writing process the secondary current passes through resistor 36 while the current through resistor 38 is a lower current, namely the secondary current minus the primary current. For this reason, resistor 36 must be smaller than 38.

Consequently, with the normal condition of the target, that is before it has been struck by the cathode-ray beam for recording, and with the associated diode nonconducting, the voltage on the target is the same as the positive voltage at terminal 43, that is the voltage C (Fig. 1). On the other hand, when the diode is conducting the voltage of the associated target is decreased by the drop in the associated resistor 38 to a value represented by C′ (Fig. 1).

The system is conditioned for recording or reading depending upon the presence or absence of the positive pulse voltage from source 35. However, in order to make a record on a particular target, the cathode-ray beam must be keyed on by the signal from source 21 at the same instance that the beam is in registry with that particular target. This latter function is, of course, controlled by the deflecting plates 26—27, 28—29, in the well-known manner. For example, if the system is conditioned for recording by the presence of the positive voltage pulse from source 35, and if a signal to be recorded on a particular target is applied to grid 14 at the instant the beam is in alignment with the window 33 and the said target 31, the potential of target 31 will be lowered to its recording potential at which it remains until wiped out as described hereinbelow.

Consequently, when the beam strikes target 31, and if the system is conditioned for recording, target 31 receives electron current from the cathode-ray beam, and current of value $C_a$ (Fig. 1) will tend to flow through resistor 38, however, the actual current will be $C'_a$ (Fig. 1), a slightly smaller value. Since target 31 releases secondary electron when struck by the beam, it instantaneously rises to a higher positive potential and this increase in voltage, $\Delta V$, is applied to electrode 39 and can be sufficiently high to start conduction through diode 40. Immediately after diode 40 begins to conduct, the voltage across its electrodes drops to the value C′ (Fig. 1). However, the diode is maintained conducting by the voltage at terminal 43 as above-mentioned. Therefore, the diode remains conductive and the associated target 31 remains at its lower or signal storing level C′.

Thus, three conditions are necessary to make a record on a particular target, which conditions must exist simultaneously. First, the pulse from source 35 must shift the potential of collector 32 to that represented by A (Fig. 1). Second, the cathode-ray beam must be directed at that particular target. Third, the cathode-ray beam must be keyed on. Thus, all those targets which, during the sweep of the cathode-ray beam, have been subjected to the above three simultaneous conditions, will remain at the lower potential C′ (Fig. 1); and all those targets which have not been subjected to the said conditions simultaneously, remain at the higher voltage C (Fig. 1). Thus, there is set up on the various and appropriate targets a voltage record of the signals applied from the source 21. After the information is thus stored on the targets, the voltage on collector 32 is dropped by removing the pulse from source 35 so that the collector 32 is now at the "reading" potential B (Fig. 1).

As pointed out above and as will be clear from Fig. 1, any target element that is at the lower or signal storing voltage, will have a much larger secondary electron current than a target having the higher voltage and this phenomenon is taken advantage of to produce a reading output signal. For this purpose, the resistance 36 is coupled through a suitable condenser 44 to an output amplifier 45 and thence to a suitable indicating circuit. As the beam sweeps over the various targets for reading, the secondary electron flow will pass from the individual targets to the collector 32 and thence through resistor 36 to the power supply 34. The voltage developed across resistor 36 when the beam strikes a particular target will indicate whether that target is at the lower signal stored level or the upper non-signal-stored level. To read the information that has been stored on the various targets, it is merely necessary therefore to direct the cathode-ray beam to the proper target or targets and to read the corresponding voltages developed in the output of amplifier 45.

For best operation, the voltage on collector 32 for the reading condition, is adjusted so that the current through resistor 36 from a target at the higher or non-stored level is equal to the current through resistor 36 when the beam strikes the collector directly. Thus, when the beam strikes a target at the lower or signal-stored voltage, a larger current will pass through resistor 36. This results in a negative voltage change at the upper end of resistor 36 when targets having a record stored thereon are scanned by the beam. On the other hand, no change will occur in the current through resistor 36 when the beam strikes a target at the upper or non-storing level. It should be observed that during the scanning by the beam for reading, no new target elements can be accidentally changed to the higher or storing level, because of the small magnitude of the current to these targets which are floating or insulated from ground, this small value of current being shown at C in Fig. 1.

To erase the record on those targets which have been placed at the lower or storing voltage level, an erase pulse from a suitable source 46 can be connected to the source 37. Preferably source 37, like source 34, has a voltage regulator circuit to which the erase pulse is applied. The effect of that erase pulse is to drop the power supply voltage from the source 37 to a very low value and to maintain it at that low value until all the targets have been erased.

It will be understood, of course, that the rectangular positive pulse from source 35 that is used for setting up the storing or recording condition has a time duration equal to that necessary to enable the beam to scan all the targets, and the beam can have its deflection synchronized or timed with a scanning element at a signal generator 47. For example, generator 47 may include a scanning element which is designed to scan for example 100 different points each of which is represented by one of the targets 31. It will be understood, of course, that the targets 31 can be arranged in circular rows rather than in linear rows, and the beam from gun 11 can execute a circular scanning trace of successively smaller diameter.

Various changes and modifications may be made in the specific embodiment of the invention described above without departing from the scope thereof.

What is claimed is:

1. Signal storage apparatus comprising in combination, means to develop a cathode-ray beam, a plurality of secondary emission targets to be scanned by said beam, a secondary electron collector, a plurality of gaseous conduction devices each having a pair of electrodes in an ionizable medium, means connecting one electrode of each device to a corresponding target, a source of direct current potential for said devices, means connecting each device in series with a respective voltage divider impedance across the terminals of said source with the positive terminal of the source connected to each target through a respective one of said impedances, the negative terminal of the source being connected in parallel to the other electrode of each device, said source being of insufficient voltage normally to render the said devices conductive, and means to selectively impinge said beam upon any target and thereby momentarily raise the target potential to cause the associated gaseous conduction device to become conductive and thereby to drop the potential of said target to a steady value as long as the associated device is conductive.

2. Signal storage apparatus comprising in combination, means to develop a cathode ray beam, a plurality of secondary emission targets to be scanned by said beam, a plurality of gas diodes, a common voltage source connected to said diodes but normally insufficient to bias a diode to conduction but sufficient to maintain a diode conducting, and means responsive to the impinging by said beam on a target to render the associated diode conductive and thereby to maintain the said associated target at a predetermined signal storage potential even after the beam ceases to impinge on said target.

3. Signal storage apparatus comprising in combination, means to develop a cathode ray beam, a plurality of secondary emission targets to be scanned by said beam and capable of assuming one of two discrete potentials, a series of gas diodes each connected to a corresponding one of said targets, a collector electrode whose potential determines the current flow to or from a target when struck by said beam, and means responsive to the scanning of a target by said beam to render the associated diode conducting and thereby to maintain said target at the lower of said two discrete potentials even after the beam has moved away from said target.

4. Signal storage apparatus comprising in combination, means to develop a cathode ray beam, a plurality of targets to be scanned by said beam, a common voltage source for all said targets, individual gas diodes each connected in circuit between said source and a corresponding target, individual impedances each connected between said source and a corresponding target, said source normally being insufficient to bias the diodes to conduction, and means responsive to the scanning of a target by said beam to bias the associated diode to conduction and to maintain it conductive and thereby to maintain the associated target at a predetermined voltage level representing a stored signal even after the beam has moved away from the target.

5. Signal storage apparatus comprising in combination, means to develop a cathode-ray beam, a plurality of secondary emission targets to be scanned by said beam and arranged to assume two different potentials one for signal recording and the other for signal reading of the recorded signals, a plurality of gaseous conduction devices each connected in circuit with a corresponding target, a source of potential having the negative pole connected in common to one electrode of each of said devices, and the positive terminal of said source being connected in common to the other electrode of each of said devices but through a respective individual impedance, said other electrode of each device being connected to a respective one of said targets, said source being of insufficient potential normally to render said devices conductive but being of sufficient potential to maintain said devices conductive once they become conductive, a common collector electrode for said targets, means for biasing said collector electrode to a target recording control potential and to a target reading control potential each target when not impinged upon by the beam assuming a positive potential which however is insufficient to render the associated gaseous device conductive, means to cause said beam to scan said targets and to selectively impinge upon one or more of said targets and effective when the said collector electrode is biased to recording control potential to momentarily increase the target potential and simultaneously to render the associated gaseous device conductive, and thereupon to drop the potential of the associated target to the lower of said two potentials and to maintain such target at said lower potential even after the cathode-ray beam leaves the said target.

6. Signal storage apparatus comprising in combination, means to develop a cathode-ray beam, a plurality of secondary emission targets to be scanned by said beam, a plurality of electron return circuits for the beam each one connected to a corresponding target, each return circuit including two branches one branch including one of a plurality of gas diodes the other branch including one of a plurality of high impedances, a direct current voltage source, the negative pole of said source being connected in common to one electrode of each of said diodes, the other electrode of each of said diodes being connected through an individual one of said impedances and thence in parallel to the positive pole of said source, each of said other electrodes of said diodes being also individually connected to a corresponding one of said targets, means effective when the cathode-ray beam strikes a target to develop a momentary positive voltage increase at the target and thereby to render the associated diode conductive, said source of direct current voltage thereupon maintaining said diode conductive and simultaneously dropping the potential of the associated target to a signal-storage level even after the beam leaves said target.

7. Signal storage apparatus comprising in combination, means to develop a cathode ray beam, a plurality of secondary emission targets, a collector electrode for said targets, means to bias said collector electrode to two different potentials to control respectively recording of signals on said targets and reading of signals from said targets, a source of direct current voltage, a plurality of circuits connected across said source, each circuit including one of a plurality of gas diodes and one of a plurality of high impedances, means connecting the negative pole of said source in common to one electrode of each of said diodes, means connecting the other electrode of each diode through a respective one of said high impedances and thence in parallel to the positive pole of said source, means connecting the junction point between each diode and impedance to a corresponding one of said targets, said source being of insufficient voltage level to render a diode conductive but being of sufficient level to maintain the diode conductive once it becomes conductive, and means responsive to the scanning of a target by said beam and while said collector is biased to recording control potential to cause the target momentarily to increase its positive potential sufficiently to bias the associated diode to conduction and thereupon dropping the potential of the said target to a signal storage level and for maintaining said target at said dropped potential even after the beam leaves said target.

8. Signal storage apparatus comprising in combination, means to develop a cathode ray beam, a plurality of secondary emission targets arranged to assume two different potentials one representing signal storage and the other representing signal reading, a secondary emission collector electrode, means to bias said collector electrode to two different potentials to control respectively recording of signals on said targets and reading of signals from said targets, a source of direct current voltage, a plurality of shunts connected across the terminals of said source, there being one shunt for each target each shunt including in series a high impedance and a gas diode with each target connected to the junction point between the high impedance and gas diode of a corresponding shunt, said source being insufficient normally to bias the diodes to conduction but sufficient to maintain them conductive once they become conductive, means effective when said collector electrode is biased to recording control potential and when the beam simultaneously strikes a target to increase thereby the positive potential of the target by secondary emission to said collector electrode, and thereby to render the associated diode conductive, said diode when conductive and said impedance cooperating to maintain the associated target at the lower potential representing a signal condition to be stored thereon even after the beam leaves said target.

9. Signal storage apparatus comprising in combination, means to develop a cathode ray beam, a plurality of secondary emission targets upon which the beam impinges arranged to assume two different potentials one representing signal storage and the other representing signal reading, a source of direct current voltage, a plurality of voltage dividers connected across said source, each divider including in series a gas diode and an impedance, means connecting the negative pole of said source in parallel with one electrode of each gas diode, the other electrode of each diode being connected through a respective impedance to the positive pole of said source means connecting the junction point between each diode and impedance to a corresponding one of said targets, said source being normally insufficient to bias the diodes to conduction but sufficient to maintain them conductive, a collector electrode for said targets, means to alternately bias said collector electrode to two different positive potentials one to control recording on said targets and one to control reading from said targets, means effective when the collector electrode is biassed to the recording control potential and when the beam simultaneously strikes a target to bias the associated diode to conduction and thereby to drop the potential of said target to the lower of said two potentials and to maintain it at said lower potential representing a signal recording level even after the beam leaves said target.

10. Signal storage apparatus according to claim 9 in which said means for biassing said collector electrode includes a source of direct current potential connected through a high impedance to the collector electrode, said collector electrode being connected to a signal reading output circuit.

11. Signal storage apparatus according to claim 2 in which means are provided to lower the voltage of said source to restore all the targets to a normal potential in readiness to be acted upon by the cathode ray beam for signal recording.

12. Signal storage apparatus comprising a series of secondary emission targets, means to develop a cathode ray beam, means to deflect said beam to scan said targets in a predetermined pattern, said targets being normally maintained at one voltage level to represent one signal condition to be recorded and at a lower voltage level to represent a different signal condition to be recorded, signal controlled means to key said beam on and off to represent said signal conditions, a collector electrode for said targets, and means to drop the potential of target to said lower voltage only when the beam is keyed on, the last mentioned means including a gas diode connected to the target, a source of direct current voltage for the diode said source being of insufficient voltage level to bias the diode to conduction but being sufficient to maintain it conductive even after the beam leaves said target, said source having its positive terminal connected in parallel through a series of impedances to one electrode of each diode and also to a corresponding one of said targets, the other electrode of each diode being connected to the negative terminal of said source.

13. Signal storage apparatus according to claim 12 in which said source of direct current voltage is provided with means to drop it to a voltage level lower than that required to maintain the diode conductive for the purpose of restoring the targets to their normal voltage level.

14. Signal storage apparatus according to claim 12 in which said collector electrode is connected to a source of target current potential, and means are provided to maintain the collector potential at a predetermined voltage for recording said signal conditions and at a lower voltage to read the recorded signal conditions and without changing their recorded condition.

15. Signal storage apparatus according to claim 12 in which said source of direct current voltage for the diodes is connected to an erasing pulse source for lowering the potential of said direct current voltage source below that necessary to maintain the diode conductive.

16. Signal storage apparatus according to claim 12 in which said collector electrode is connected to a source of direct current bias the last mentioned source being also connected to a pulse source for maintaining it at two discrete voltage levels one for signal recording on said targets and the other for signal reading from said targets.

References Cited in the file of this patent

UNITED STATES PATENTS

| | | |
|---|---|---|
| 2,212,645 | Morton | Aug. 27, 1940 |
| 2,457,892 | Hibbard | Jan. 4, 1949 |
| 2,480,130 | Grieg | Aug. 30, 1949 |
| 2,564,908 | Kutchinsky | Aug. 31, 1951 |